(12) United States Patent
Terashita et al.

(10) Patent No.: US 11,536,673 B2
(45) Date of Patent: Dec. 27, 2022

(54) ANALYSIS SYSTEM, ANALYSIS APPARATUS, SERVER, AND INFORMATION PROCESSING METHOD

(71) Applicant: Shimadzu Corporation, Kyoto (JP)

(72) Inventors: Eisaku Terashita, Kyoto (JP); Keijiro Suzuki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 451 days.

(21) Appl. No.: 16/698,550

(22) Filed: Nov. 27, 2019

(65) Prior Publication Data
US 2020/0174983 A1    Jun. 4, 2020

(30) Foreign Application Priority Data
Nov. 30, 2018  (JP) .............................. JP2018-224803

(51) Int. Cl.
*G01N 23/223*    (2006.01)
*G01N 35/00*     (2006.01)

(52) U.S. Cl.
CPC ........... *G01N 23/223* (2013.01); *G01N 35/00* (2013.01); *G01N 35/00871* (2013.01); *G01N 2223/076* (2013.01); *G01N 2223/413* (2013.01)

(58) Field of Classification Search
CPC ............. G01N 35/00; G01N 35/00871; G01N 23/223; G01N 2223/076; G01N 2223/413
USPC ........................................................ 702/189
See application file for complete search history.

(56) References Cited

U.S. PATENT DOCUMENTS

| | | | |
|---|---|---|---|
| 2002/0010867 A1* | 1/2002 | Schaefer | G06F 16/252 709/229 |
| 2002/0055824 A1* | 5/2002 | Shibata | G05B 23/0264 702/187 |
| 2003/0105811 A1 | 6/2003 | Laborde | |

(Continued)

FOREIGN PATENT DOCUMENTS

| | | |
|---|---|---|
| EP | 1145149 A2 | 10/2001 |
| EP | 1145149 B1 | 10/2001 |

(Continued)

OTHER PUBLICATIONS

European Search Report for corresponding patent application EP19211434.6, dated May 12, 2020.
(Continued)

*Primary Examiner* — John H Le
(74) *Attorney, Agent, or Firm* — Muir Patent Law, PLLC

(57) ABSTRACT

In an analysis system in which a plurality of analysis apparatuses and a server are communicably connected, the plurality of analysis apparatuses each includes: an apparatus body that measures a sample; and an information processor that analyzes measurement data by the apparatus body. The information processor has a first storage unit for storing the measurement data and an analysis result of the measurement data, generates an analysis result summary based on the analysis result stored in the first storage unit, the analysis result summary indicating an outline of the analysis result, and transmits the analysis result summary to the server. The server has a second storage unit, and constructs a database in which analysis result summaries received from the information processor are accumulated, and stores the database into the second storage unit.

9 Claims, 11 Drawing Sheets

(56) References Cited

U.S. PATENT DOCUMENTS

2006/0263905 A1* 11/2006 Mishima .......... G01N 33/56972
436/520
2012/0029934 A1* 2/2012 Shindo ............. G01N 35/00871
705/2

FOREIGN PATENT DOCUMENTS

JP       2006-313171 A     11/2006
JP       2009-169888 A     7/2009

OTHER PUBLICATIONS

Office Action from the Japanese Patent Office, dated Feb. 10, 2022 for Japanese Patent Application No. JP 2018-224803.
Communication from the European Patent Office, dated Oct. 12, 2022, in counterpart European Patent Application 19211434.6 (4 pages).
First Office Action from the State Intellectual Property Office of the People's Republic of China, dated Sep. 2, 2022, in counterpart Chinese Patent Application 2019112017862 , with English-language translation (9 pages).

* cited by examiner

FIG.8

|  | MEASUREMENT DATA NAME | ANALYSIS VALUE |
|---|---|---|
| ☐ | A***.datqn | Cd:a1ppm, Pb:b1ppm, Hg:c1ppm, ⋯ |
| ☐ | B***.datqn | Cd:a2ppm, Pb:b2ppm, Hg:c2ppm, ⋯ |
| ☑ | C***.datqn | Cd:a3ppm, Pb:b3ppm, Hg:c3ppm, ⋯ |
| ☐ | D***.datqn | Cd:a4ppm, Pb:b4ppm, Hg:c4ppm, ⋯ |
| ☐ | E***.datqn | Cd:a5ppm, Pb:b5ppm, Hg:c5ppm, ⋯ |
| ⋮ | ⋮ | ⋮ |

FIG.9

| APPARATUS NAME | REQUEST FILE |
|---|---|
| EDX1 | C***.datqn |

ANALYSIS SYSTEM, ANALYSIS APPARATUS, SERVER, AND INFORMATION PROCESSING METHOD

BACKGROUND OF THE INVENTION

Field of the Invention

The present invention relates to an analysis system, an analysis apparatus, a server, and an information processing method.

Description of the Background Art

Japanese Patent Laying-Open No. 2006-313171 discloses an analysis system in which multiple analysis apparatuses for analyzing samples are connected to a server over the Internet. In the above literature, the server includes a database for accumulating data that is related to analysis conditions of the analysis apparatuses, and the information related to analyses which are conducted by a large number of individuals and organizations are accumulated as databases, thereby allowing anyone to share the accumulated information.

SUMMARY OF THE INVENTION

In the analysis system mentioned above, it is often the case that the measurement data are desired to be shared among the multiple analysis apparatuses connected to the server. To that end, upon receipt of measurement data from the multiple analysis apparatuses, the server constructs a database of the received measurement data, and stores it into a storage. In this way, a user of each analysis apparatus is allowed to search databases for measurement data provided by the other analysis apparatuses, and download the measurement data to his/her own apparatus.

However, depending on a method of analysis and a subject to be analyzed, one measurement data can have a large file size. Thus, the capacity of the storage for storing databases needs to be sufficiently large in order to accumulate, into databases, all the multiple measurement data items transmitted from multiple analysis apparatuses. If the storage is running out of capacity, a storage capacity needs to be added. As a result, operating costs for the analysis system may increase.

Moreover, depending on a subject to be analyzed, the user does not require to view the entirety of the measurement data, and may wish to view a specific quantitative value of the measurement data. In such a case also, the user needs to take a procedure of downloading the measurement data from the server and extracting the specific quantitative value from the measurement data, which may lower the user convenience.

The present invention is made to solve such problems, and an object of the present invention is to inhibit an increase in capacity of the storage of a server and achieve sharing of measurement data among a plurality of analysis apparatuses with high user convenience in an analysis system in which the plurality of analysis apparatuses and the server are communicably connected.

An analysis system according to a certain aspect of the present invention is an analysis system in which a plurality of analysis apparatuses and a server are communicably connected, the plurality of analysis apparatuses, each including: an apparatus body that measures a sample; and an information processor that analyzes measurement data measured by the apparatus body, wherein the information processor has a first storage unit for storing the measurement data and an analysis result of the measurement data, generates an analysis result summary, based on the analysis result stored in the first storage unit, the analysis result summary indicating an outline of the analysis result, and transmits the analysis result summary to the server, and the server has a second storage unit, constructs a database for accumulating the analysis result summary received from the information processor, and stores the database into the second storage unit.

According to the above analysis system, the server can construct and manage databases for the analysis result summaries by the plurality of analysis apparatuses, thereby providing the user of each analysis apparatus with a service to view analysis result summaries by the other analysis apparatuses. As compared to measurement data, the analysis result summary can be reduced in file size. Thus, as compared to storing the measurement data into the second storage unit, the capacity of the second storage unit that is required to construct the databases can be kept small even if all the analysis result summaries transmitted from the analysis apparatuses to the server are stored into the second storage unit. Accordingly, a shortage of capacity of the second storage unit can be avoided, resulting in inhibiting an increase of operating costs of the analysis system.

Moreover, the user of each analysis apparatus is allowed to immediately know a specific quantitative value of measurement data by downloading an analysis result summary from the server. Accordingly, improved user convenience is achieved.

Preferably, the server publishes to the plurality of analysis apparatuses a list of analysis result summaries accumulated in the database. The list of analysis result summaries includes the analysis result summary. The list of analysis result summaries includes data in which a file name of the measurement data and the analysis result summary for the measurement data are associated.

In this way, by referring to a list of analysis result summaries, the user of each analysis apparatus can select measurement data that the user wishes to review the details thereof.

Preferably, the plurality of analysis apparatuses include a first analysis apparatus and a second analysis apparatus respectively having a first information processor and a second information processor. Upon selection of the measurement data by the first analysis apparatus from the list of analysis result summaries, the second information processor transmits to the server a view request for viewing the selected measurement data. The server notifies the first information processor of the view request from the second information processor. Upon notice of the view request from the server, the first information processor reads the requested measurement data from the first storage unit and transmits the requested measurement data to the server. The second information processor receives the measurement data from the server.

In this way, the user of each analysis apparatus can view the measurement data by the other analysis apparatuses via the server.

Preferably, the analysis result summary includes document data representing the outline of the analysis result for the measurement data. With this, the file size of the analysis result summary can be reduced smaller than the file size of the measurement data, thereby allowing the capacity of the second storage unit that is required to construct the database to be kept small.

Preferably, the analysis result summary is smaller in file size than the measurement data. With this, the file size of the analysis result summary can be reduced smaller than the file size of the measurement data, thereby allowing the capacity of the second storage unit that is required to construct the database to be kept small.

Preferably, the information processor included in each of the plurality of analysis apparatuses transmits the analysis result summary to the server per given transmission cycle. Upon receipt of the view request, the first information processor transmits the requested measurement data to the server when transmitting a subsequent analysis result summary.

In this way, the measurement data is transmitted to the server at the same time the analysis result summary is transmitted thereto, thereby allowing a reduction of load on the server.

Preferably, the information processor included in each of the plurality of analysis apparatuses transmits the analysis result summary to the server per given transmission cycle. Upon receipt of the view request, the first information processor transmits the requested measurement data to the server prior to transmission of a subsequent analysis result summary.

In this way, if immediacy is demanded, such as the user wishes to obtain measurement data urgently, the user can obtain the measurement data that the user wishes for, without waiting for a time the subsequent analysis result summary is transmitted.

An analysis apparatus according to another aspect of the present invention is an analysis apparatus communicably connectable to a server, the analysis apparatus including: an apparatus body that measures a sample; and an information processor that analyzes measurement data measured by the apparatus body, wherein the information processor has a storage unit for storing the measurement data and an analysis result of the measurement data, generates an analysis result summary, based on the analysis result stored in the storage unit, the analysis result summary indicating an outline of the analysis result, and transmits the analysis result summary to the server.

According to the above analysis apparatus, the server can construct the database of the analysis result summaries transmitted from each analysis apparatus, thereby allowing the analysis result summaries to be shared among the plurality of analysis apparatuses.

Preferably, the server has a database for accumulating a plurality of analysis result summaries transmitted from a plurality of analysis apparatuses and publishes a list of analysis results to the plurality of analysis apparatuses. The list of the plurality of analysis result summaries includes the analysis result summary. The plurality of analysis apparatuses includes the analysis apparatus, which are communicably connected to the server. The list of the plurality of analysis result summaries includes data in which a file name of the measurement data and the analysis result summary for the measurement data are associated. Upon selection of the measurement data by another analysis apparatus, among the plurality of analysis apparatuses, from the list of the plurality of analysis result summaries, the information processor transmits a view request for viewing the selected measurement data to the server.

With this, by referring to a list of analysis result summaries, the user of each analysis apparatus can select measurement data that the user wishes to review the details thereof.

Preferably, upon notice of the view request for viewing the measurement data by the own analysis apparatus from the server, the information processor reads the requested measurement data from the storage unit and transmits the requested measurement data to the server.

With this, the measurement data that is requested for viewing can be transmitted to the other analysis apparatuses via the server.

According to another aspect of the present invention, a server communicably connectable to a plurality of analysis apparatuses, the plurality of analysis apparatuses each including: an apparatus body that measures a sample; and an information processor that analyzes measurement data measured by the apparatus body. The information processor generates an analysis result summary, based on an analysis result of the measurement data, the analysis result summary indicating an outline of the analysis result, and transmits the analysis result summary to the server. The server has a storage unit. The server constructs a database in which the analysis result summary received from the information processor is accumulated, and stores the database into the storage unit.

According to the above server, the server can construct and manage databases for the analysis result summaries by the plurality of analysis apparatuses, thereby providing the user of each analysis apparatus with a service to view analysis result summaries by the other analysis apparatuses. As compared to measurement data, the analysis result summary can be reduced in file size. Thus, the capacity of the storage unit that is required to construct the databases can be kept small. Accordingly, a shortage of capacity of the storage unit can be avoided, resulting in inhibiting an increase of operating costs of the analysis system. Moreover, the user of each analysis apparatus is allowed to immediately know a specific quantitative value of measurement data by downloading an analysis result summary from the server. Accordingly, improved user convenience is achieved.

Preferably, the server publishes to the plurality of analysis apparatuses a list of analysis result summaries accumulated in the database. The list of analysis result summaries includes the analysis result summary. The list of analysis result summaries includes data in which a file name of the measurement data and the analysis result summary for the measurement data are associated.

With this, by referring to a list of analysis result summaries, the user of each analysis apparatus can select measurement data that the user wishes to review the details thereof.

An information processing method according to another aspect of the present invention is an information processing method in an analysis system in which a plurality of analysis apparatuses and a server are communicably connected, wherein the plurality of analysis apparatuses each include a first storage unit for storing measurement data of a sample and an analysis result of a measurement result, and the server has a second storage unit. The information processing method includes:

generating, by each of the plurality of analysis apparatuses, an analysis result summary based on the analysis result stored in the first storage unit, the analysis result summary indicating an outline of the analysis result, and transmitting the analysis result summary to the server; and constructing, by the server, a database of a plurality of analysis result summaries transmitted from the plurality of analysis apparatuses, and storing the database into the second storage unit, the plurality of analysis result summaries including the analysis result summary.

According to the above information processing method, the server can construct and manage databases for the analysis result summaries by the plurality of analysis apparatuses, thereby providing the user of each analysis apparatus with a service to view analysis result summaries by the other analysis apparatuses. As compared to measurement data, the analysis result summary can be reduced in file size. Thus, the capacity of the second storage unit that is required to construct the databases can be kept small. Moreover, the user of each analysis apparatus is allowed to immediately know a specific quantitative value of measurement data by downloading an analysis result summary from the server. Accordingly, improved user convenience is achieved.

Preferably, the information processing method further includes: publishing, by the server, a list of the plurality of analysis result summaries accumulated in the database to the plurality of analysis apparatuses. The list of the plurality of analysis result summaries includes data in which a file name of the measurement data and the analysis result summary for the measurement data are associated.

In this way, by referring to a list of analysis result summaries, the user of each analysis apparatus can select measurement data that the user wishes to review the details thereof.

Preferably, the plurality of analysis apparatuses include a first analysis apparatus and a second analysis apparatus respectively having a first information processor and a second information processor. The information processing method, further includes: upon selection of the measurement data by the first analysis apparatus from the list of the plurality of analysis result summaries, transmitting, by the second information processor, a view request for viewing the selected measurement data to the server; notifying, by the server, the first information processor of the view request from the second information processor; and upon notification of the view request from the server, reading, by the first information processor, the requested measurement data from the first storage unit and transmitting the requested measurement data to the server; and receiving, by the second information processor, the measurement data from the server.

With this, the user of each analysis apparatus can view measurement data by the other analysis apparatuses via the server.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing one example of a list of measurement data.

FIG. 9 is a diagram showing one example of a request file.

DESCRIPTION OF THE PREFERRED EMBODIMENTS

Figure 1:
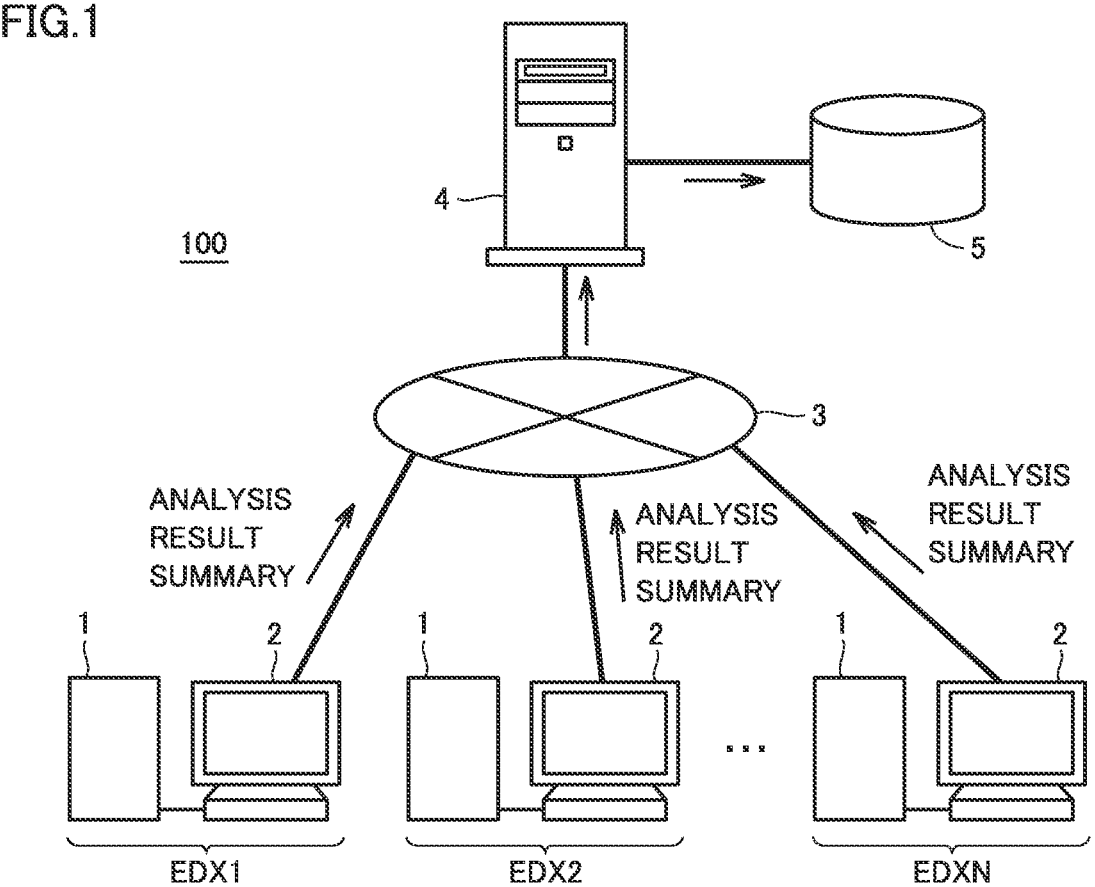
FIG. 1 is a schematic diagram illustrating a configuration example of an analysis system according to the present embodiment.

Hereinafter, an embodiment of the present invention will be described in detail, with reference to the accompanying drawings. Note that in the following, the same reference sign is used to refer to like or corresponding components in the drawings, and description thereof will in principle not be repeated.

FIG. 1 is a schematic diagram illustrating a configuration example of an analysis system according to the present embodiment.

Referring to FIG. 1, an analysis system 100 is a system which analyzes samples, and includes N analysis apparatuses EDX1 to EDXN (where N is an integer greater than or equal to 2), a server 4, and a storage 5.

Analysis apparatuses EDX1 to EDXN each analyze samples. In the following description, analysis apparatuses EDX1 to EDXN may also collectively be referred to as an analysis apparatus EDX. In the present embodiment, as analysis apparatus EDX, an X-ray fluorescence analysis apparatus will be illustrated which emits an X ray to a sample and measures X-ray fluorescence generated by the sample. The X-ray fluorescence analysis apparatus is, for example, an energy dispersive X-ray fluorescence spectrometer (EDX).

Analysis apparatus EDX includes an apparatus body 1 and an information processor 2. Apparatus body 1 measures samples. In the present embodiment, apparatus body 1 detects X-ray fluorescence generated by a sample and measures types of elements comprising the sample, contents of the elements, etc. Information processor 2 controls the measurement conducted by apparatus body 1 and carries out quantitative analysis on data measured by apparatus body 1.

Information processor 2 included in analysis apparatus EDX is connected to the Internet 3, which is a representative communication network. This communicatively connects information processors 2 included in analysis apparatuses EDX1 to EDXN to each other over the Internet 3.

Furthermore, in analysis system 100, server 4 is connected to the Internet 3. Accordingly, information processor 2 included in analysis apparatus EDX can transmit/receive data to/from server 4 via the Internet 3.

Server 4 is connected to storage 5. Storage 5 is a storage unit for saving data that are exchanged between server 4 and analysis apparatus EDX. In the example of FIG. 1, storage 5 is an external memory connected to the server. However, the storage unit may be incorporated in server 4. Storage 5 corresponds to one embodiment of a "second storage unit."

Figure 2:
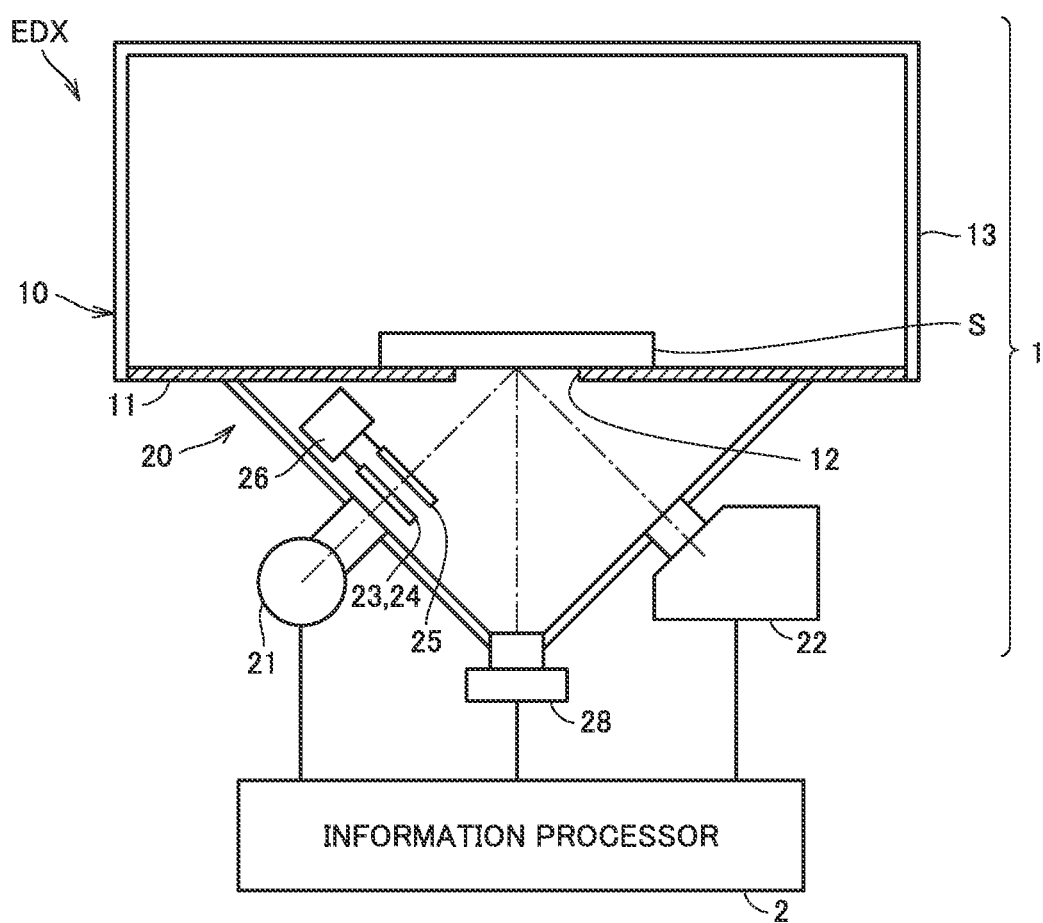
FIG. 2 is a diagram schematically showing a configuration example of the analysis apparatus shown in FIG. 1.

FIG. 2 is a diagram schematically showing a configuration example of analysis apparatus EDX shown in FIG. 1.

Referring to FIG. 2, analysis apparatus EDX is an X-ray fluorescence analysis apparatus, and apparatus body 1 comprises a sample chamber 10 and a measurement chamber 20. Spaces within sample chamber 10 and measurement chamber 20 are surrounded by a housing 13, keeping a vacuum inside sample chamber 10 and measurement chamber 20 as appropriate.

Sample chamber 10 includes a stage 11 at the bottom. Stage 11 has a circular opening 12 formed therein. A sample S is placed on stage 11 over the opening 12. Sample S is placed on stage 11 so that a measurement site of sample S is exposed through opening 12.

Measurement chamber 20 includes an X-ray tube 21 and a detector 22 on the walls. X-ray tube 21 emits a primary X ray to sample S. X-ray tube 21 has a filament which emits thermoelectron, and a target which converts the thermoelectron into a given primary X ray for emission. The primary X ray from X-ray tube 21 is emitted to the measurement site of sample S through opening 12. A secondary X ray (X-ray fluorescence) emitted by sample S incident on detector 22 which measures energy and intensity of the X-ray fluorescence.

In measurement chamber 20, a shutter 23, a primary X-ray filter 24, a collimator 25, and an imaging unit 28 are installed. Shutter 23, primary X-ray filter 24, and collimator 25 are slidable in a direction perpendicular to the plane of the drawing in FIG. 2 by a drive mechanism 26.

Shutter 23 is formed of an X-ray absorbing material such as lead. Shutter 23 can be inserted into the optical path of the primary X ray when needed, thereby blocking the primary X ray.

Primary X-ray filter 24 is formed of a metallic foil which is selected depending on a purpose. Primary X-ray filter 24 attenuates a background component contained in the primary X ray emitted by X-ray tube 21, to increase the SN ratio of a necessarily characteristic X ray. An actual apparatus employs a number of filters 24 formed of different types of metals. A filter 24 that is selected depending on a purpose is inserted into the optical path of the primary X ray by drive mechanism 26.

Collimator 25 has an aperture, which is a circular opening, in the center, and determines the size of the primary X ray beam emitted to sample S. Collimator 25 is formed of an X-ray absorbing material, such as lead and brass. In an actual apparatus, a number of collimators 25 having different apertures are arranged in parallel in a direction perpendicular to the plane of the drawing in FIG. 2, and a collimator 25 that is selected depending on a purpose is inserted onto the primary X ray beam line by drive mechanism 26.

Imaging unit 28 is installed at the bottom of measurement chamber 20.

Imaging unit 28 images the measurement site of sample S through opening 12 formed in stage 11. Imaging unit 28 includes an image sensor divided into multiple pixels, such as CMOS (Complementary Metal Oxide Semiconductor) or CCD (Charge Coupled Device). Before measurement, a measurer who carries out X-ray fluorescence analysis is allowed to display an image acquired by imaging unit 28 on a display device (not shown) and adjust the measurement site of sample S while seeing the image.

Information processor 2 mainly includes a CPU (Central Processing Unit) which is an arithmetic processing unit. For example, a personal computer or the like can be used as information processor 2. Information processor 2 is connected to X-ray tube 21, detector 22, and imaging unit 28.

Information processor 2 controls the measurement conducted by apparatus body 1. Specifically, information processor 2 controls a tube voltage, a tube current, an emission time, etc. in X-ray tube 21, and drives shutter 23, primary X-ray filter 24, and collimator 25.

Figure 3:
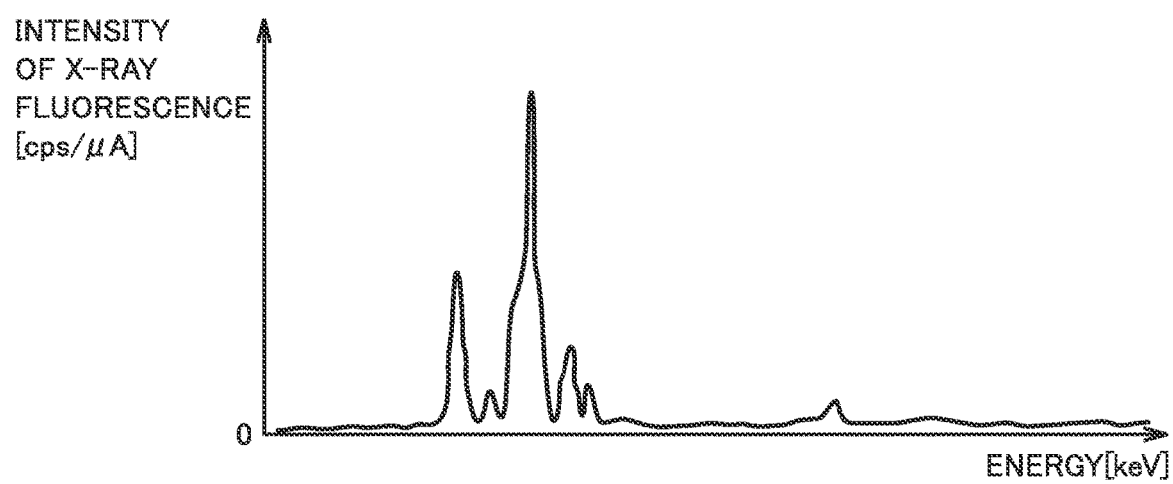
FIG. 3 is a diagram illustrating one example of measurement data acquired by an apparatus body included in the analysis apparatus.

At measurement, information processor 2 acquires the spectrum of the secondary X ray detected by detector 22. Based on the spectrum of the secondary X ray detected by detector 22, information processor 2 carries out quantitative analysis on each element. FIG. 3 is a diagram illustrating one example of measurement data acquired by apparatus body 1 of analysis apparatus EDX. FIG. 3 illustrates the spectrum of the secondary X ray detected by detector 22 included in apparatus body 1. Energy is indicated on the horizontal axis in FIG. 3, and the intensity of X-ray fluorescence is indicated on the vertical axis in FIG. 3. The spectrum of the secondary X ray exhibits X-ray fluorescence peaks at energy positions that are unique to respective elements. Accordingly, elements contained in sample S can be identified by examining the peak positions in the spectrum of the secondary X ray.

There are two quantitation methods, the FP method (fundamental parameter method) and the calibration curve method, for the identified elements. In the FP method, the quantitative value of each element is determined by reconstructing the measured intensity of X-ray fluorescence using a theoretical equation, assuming the base composition. While the calibration curve method requires creation of a calibration curve by measuring, for a number of times, standard samples which have the same composition and the contents of which are known, the FP method does not. The FP method thus has an advantage that samples can be readily analyzed. Note that the quantitative value acquired by the FP method is also called a semiquantitative value in order to distinguish it from a precise quantitative value that is determined by the calibration curve method.

Besides the data representing the spectrum of the secondary X ray shown in FIG. 3, the measurement data includes data indicative of measurement conditions. The measurement data is expressed in a software format used in analysis apparatus EDX.

Figure 4:
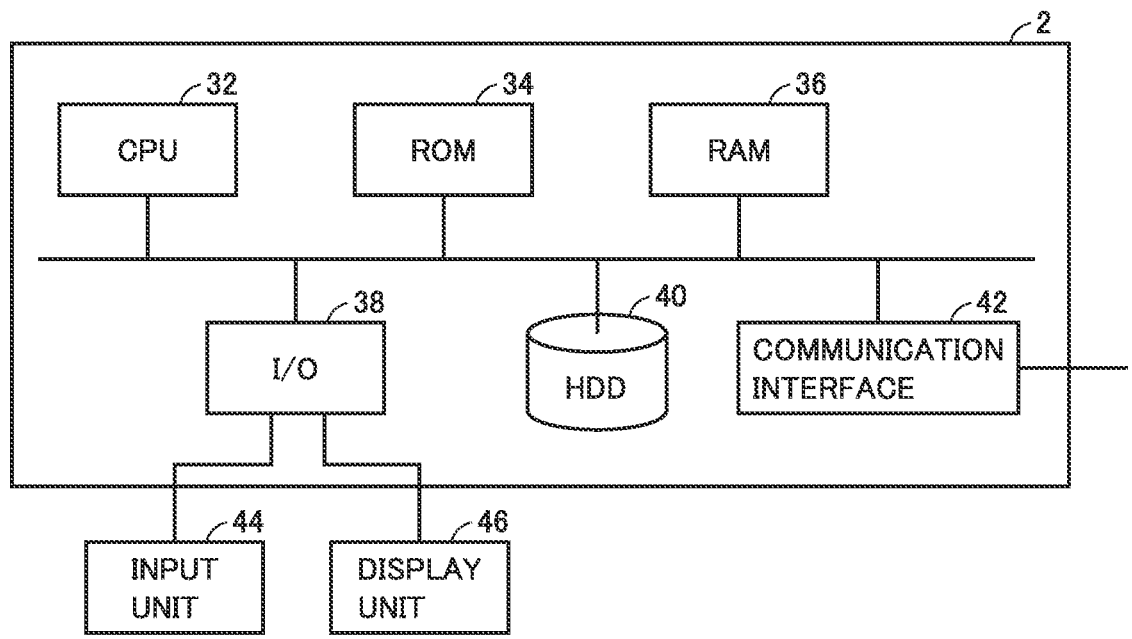
FIG. 4 is a diagram schematically showing a configuration of an information processor.

FIG. 4 is a diagram schematically showing a configuration of information processor 2.

Referring to FIG. 4, information processor 2 includes a CPU 32 for controlling the entire apparatus, and the storage unit storing programs and data. Information processor 2 operates according to the programs. The storage unit includes a ROM (Read Only Memory) 34, a RAM (Random Access Memory) 36, and a HDD (Hard Disk Drive) 40.

ROM 34 can store programs which are executed by CPU 32. RAM36 can temporarily store data used during execution of a program in CPU 32, and function as a temporary data memory used as a work area. HDD 40 is a non-volatile memory device. HDD 40 can store measurement data by apparatus body 1, image data acquired by imaging unit 28, and information generated by information processor 2, such as an analysis result by information processor 2. In addition to or alternative to HDD 40, a semiconductor memory device, such as a flash memory, may be employed. HDD 40 corresponds to one embodiment of a "first storage unit."

Information processor 2 further includes a communication interface 42, an input/output (I/O) interface 38, an input unit 44, and a display unit 46. Communication interface 42 is an interface for information processor 2 to communicate with external devices, including apparatus body 1 and server 4.

I/O interface 38 is input/output interface to/from information processor 2. As shown in FIG. 4, I/O interface 38 is connected to input unit 44 and display unit 46.

Input unit 44 receives inputs, including instructions from the measurer to information processor 2. Input unit 44 includes a keyboard, a mouse, and a touch panel integrated with the display screen of display unit 46, etc., and receives sample measurement conditions and imaging instructions directed to imaging unit 28.

Display unit 46 is capable of displaying, for example, the input screen for measurement conditions for setting measurement conditions, and images of the measurement site of sample S acquired by imaging unit 28. During the measurement, display unit 46 is capable of displaying the spectrum of the secondary X ray detected by detector 22 and an analysis result by information processor 2, together with images showing the measurement site of sample S acquired by imaging unit 28.

Figure 5:
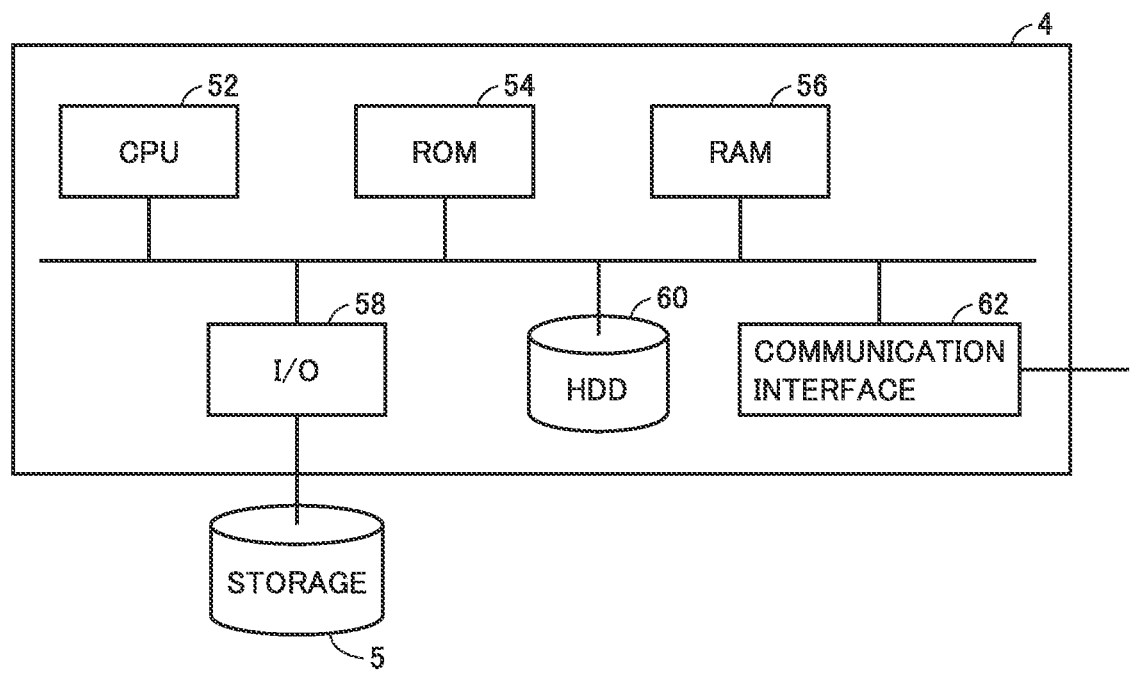
FIG. 5 is a diagram schematically showing a configuration of a server.

FIG. 5 is a diagram schematically showing a configuration of server 4.

Referring to FIG. 5, server 4 includes a CPU 52 for controlling the entire apparatus, and the storage unit storing programs and data. Server 4 operates according to the programs. The storage unit includes a ROM 54, a RAM 56, a HDD 60, and a storage 5.

ROM 54 can store programs which are executed by CPU 52. RAM 56 can temporarily store data used during execution of a program in CPU 52, and function as a temporary data memory used as a work area. HDD 60 and storage 5 are non-volatile memory devices, and can store information transmitted from information processor 2.

Information processor 2 further includes a communication interface 62 and an I/O interface 58. Communication interface 62 is an interface for server 4 to communicate with external devices, including information processor 2.

I/O interface 58 is input/output interface to/from server 4. I/O interface 58 is connected to storage 5. Storage 5 is a memory for accumulating data exchanged between server 4 and information processor 2.

Server 4 can be configured with functionality corresponding to a general computer. Server 4 may further include a display unit and an input unit.

Returning to FIG. 1, in analysis apparatus EDX, as apparatus body 1 measures sample S, information processor 2 stores the measurement data, including the spectrum of the secondary X ray shown in FIG. 3, into HDD 40 (FIG. 4). Information processor 2 also carries out quantitative analysis on the measurement data and stores an analysis result into HDD 40.

For each pre-set transmission cycle T, information processor 2 generates an analysis result summary for each of one or more analysis results stored in HDD 40, the analysis result summary being corresponding to an outline of an analysis result. Information processor 2 transmits the generated analysis result summary to server 4 via the Internet 3. Note that transmission cycle T for the analysis result summary can be set to any time period, such as a few hours, one day, one week, etc., by a higher-ranking control device that manages analysis system 100. Alternatively, the time of transmission of the analysis result summary may be set to any time by the user using input unit 44.

Figure 6:
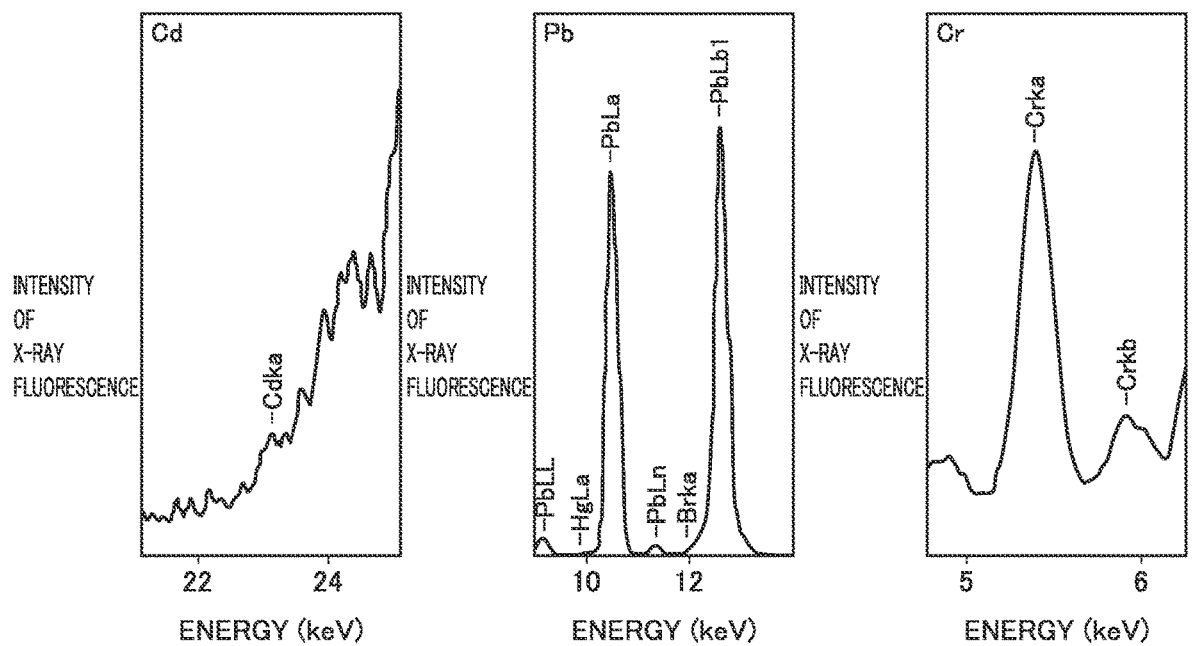
FIG. 6 is a diagram showing one example of an analysis result summary.

FIG. 6 is a diagram showing one example of the analysis result summary. In the example of FIG. 6, an analysis result of certain measurement data acquired during one transmission cycle T is tabulated in the analysis result summary.

The table in FIG. 6 is a summary of results of element quantitative analysis on cadmium (Cd), lead (Pb), mercury (Hg), polybrominated biphenyl (PBB), polybrominated diphenyl ether (PBDE), and hexavalent chromium (Cr) contained in sample S, in compliance with RoHS regulations (Directive on the Restriction of the Use of Certain Hazardous Substances in Electrical Equipment). The table is in a format in which the quantitative value, standard deviation a, and a determination result for each analyzed element.

A file name of the measurement data from quantitative analysis is provided on the measurement data name.

For the quantitative value, the quantitative value (semi-quantitative value) of each element determined by the FP method in which the measured intensity of X-ray fluorescence is reconstructed using a theoretical equation, assuming the base composition for a product which is sample S. A quantitative value determined by the calibration curve method may, of course, be used.

Standard deviation a is calculated, for example, from values of concentration of an element which are calculated multiple times based on measurement results obtained by repeatedly measuring the X-ray fluorescence. Alternatively, standard deviation $\sigma$ is calculated from an ideal $\sigma$ determined by measuring the X-ray fluorescence once.

A determination result is based on a comparison of the quantitative value with a predetermined management reference value, and represented in three scales, for example, "OK," "NG," and "GREY ZONE." For example, it is determined as "OK" if the quantitative value is less than a first management reference value. It is determined as "NG" if the quantitative value is above a second management reference value higher than the first management reference value. It is determined as "GREY ZONE" if the quantitative value is greater than or equal to the first management reference value and less than or equal to the second management reference value.

The analysis result summary may further include the spectrum of the secondary X ray. The example of FIG. 6 shows the spectrum of at least one element (Cd, Pb, Cr) among analyzed elements.

However, the spectrum of the secondary X ray included in the analysis result summary is document data, such as a PDF (Portable Document Format) file converted from image data representing the profile of the secondary X ray shown in FIG. 3. Accordingly, the file size of spectrum data is smaller than the file size of measurement data as is.

Here, the analysis result summary shown in FIG. 6 is generated based on the measurement data acquired by measuring sample S by analysis apparatus EDX. The measurement data includes data (see FIG. 3) representing the spectrum of the secondary X ray detected by detector 22 included in apparatus body 1, and is constructed of measurement values of the intensities of X-ray fluorescence of respective energies. Measurement data may have a file size from a few MB to tens of MB. For example, if the analysis apparatus is a GCMS (gas chromatograph mass spectrometer), the file size of the measurement data may be tens of MB.

In contrast, the analysis result summary can be constructed of a text file consisting of only text information expressed in a table format, and a PDF file which is data of the spectrum of the secondary X ray. The file size of the analysis result summary is about a few KB, thereby allowing for a significant reduction in file size, as compared to measurement data.

Figure 11:
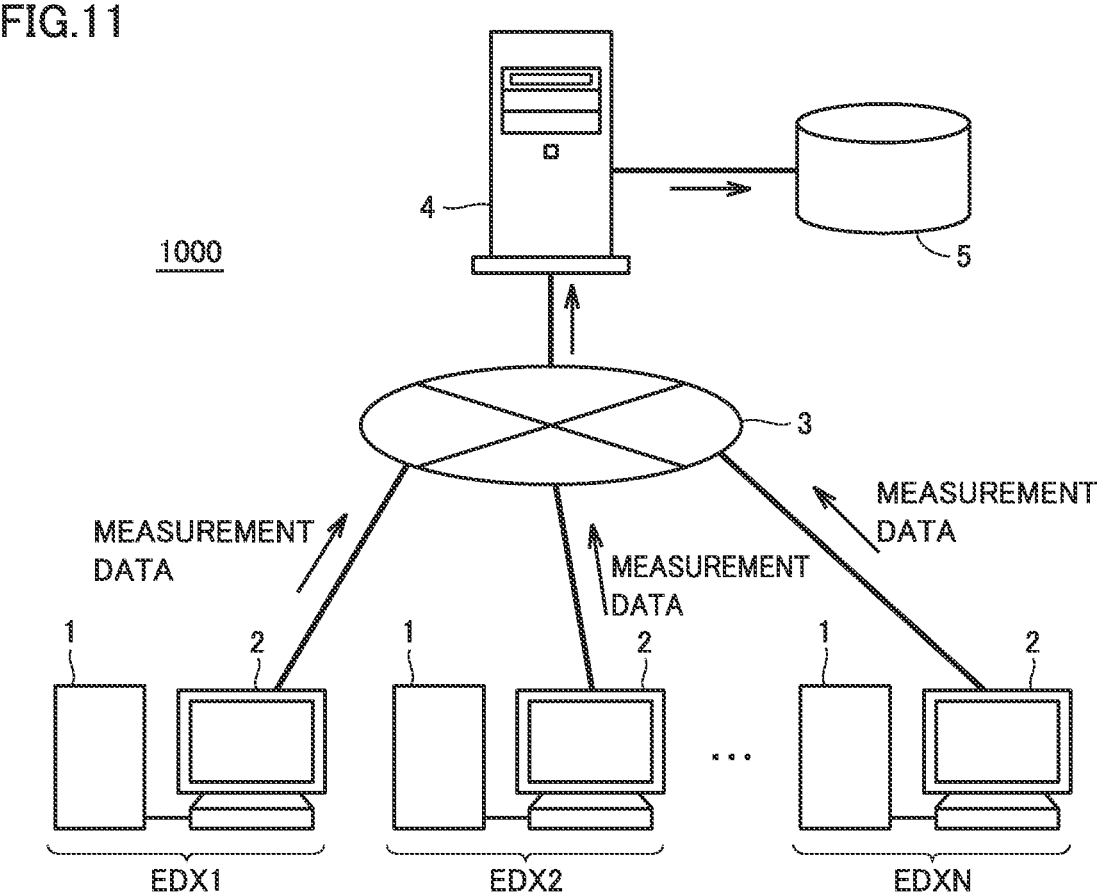
FIG. 11 is a schematic diagram illustrating a configuration example of a conventional analysis system.

FIG. 11 is a schematic diagram illustrating a configuration example of conventional analysis system 1000. Referring to FIG. 11, conventional analysis system 1000 has the same basic configuration as analysis system 100, shown in FIG. 1, according to the present embodiment, except for information processor 2 included in analysis apparatus EDX transmitting the measurement data by apparatus body 1 to server 4 via the Internet 3. Specifically, information processor 2 included in conventional analysis system 1000 transmits the measurement data by apparatus body 1 to server 4 per given transmission cycle T.

Upon receipt of the measurement data transmitted from each analysis apparatus EDX, server 4 constructs a database related to the measurement data by analysis apparatus EDX. The constructed database is used by analysis apparatuses EDX1 to EDXN to search measurement data. The database is stored in storage 5.

As such, server 4 constructs and manages the database of the measurement data by analysis apparatus EDX, thereby providing the user of each analysis apparatus EDX with a service to view the measurement data by the other analysis apparatuses EDX.

However, if the file size per measurement data is tens of MB, on the other hand, the capacity of storage 5 needs to be sufficiently large in order to store into storage 5 all the measurement data that are periodically transmitted from each analysis apparatus EDX. In particular, if one wish to store the measurement data for an extended period of time, the need for a large capacity of storage 5 is substantial. In the event of a shortage of capacity of storage 5, the capacity of storage 5 needs to be added more. As a result, operating costs for the analysis system may increase.

Moreover, depending on a subject to be analyzed, the user does not require to view the entirety of the measurement data, and may wish to view a specific quantitative value of the measurement data. In such a case also, the user needs to take a procedure of downloading the measurement data from the server and extracting the specific quantitative value from the measurement data, which may lower the user convenience.

In contrast, in analysis system 100 according to the present embodiment, information processor 2 included in each analysis apparatus EDX transmits to server 4 an analysis result summary, instead of the measurement data, the analysis result summary being an outline of an analysis result of the measurement data. Upon receipt of the analysis result summary from each analysis apparatus EDX, server 4 constructs a database of the analysis result summary and stores it into storage 5. Accordingly, in the present embodiment, server 4 constructs and manages the database of the analysis result summary by analysis apparatus EDX, thereby providing the user of each analysis apparatus EDX with a service to view the analysis result summaries by the other analysis apparatuses EDX.

With this, the analysis result summary can be sufficiently reduced in file size as compared to measurement data. Thus, as compared to conventional analysis system 1000 (see FIG. 11) which stores the measurement data into storage 5, the capacity of storage 5 that is required to construct the databases can be kept small even if all the analysis result summaries transmitted from analysis apparatuses EDX to server 4 are stored into storage 5. Accordingly, a shortage of capacity of storage 5 can be avoided, resulting in inhibiting an increase of operating costs of analysis system 100.

Moreover, since the analysis result summary contains data indicative of a quantitative value for each element analyzed, the user is allowed to immediately know a specific quantitative value of an element in measurement data by downloading an analysis result summary from server 4. Accordingly, improved user convenience is achieved.

Furthermore, in the present embodiment, information processor 2 included in each analysis apparatus EDX can view measurement data by the other analysis apparatuses EDX by transmitting via server 4 to information processors 2 included in the other analysis apparatuses EDX a view request for viewing the measurement data, as will be described below.

In the following, operations of analysis apparatus EDX and server 4 in analysis system 100 according to the present embodiment will be described with reference to FIG. 7.

Figure 7:
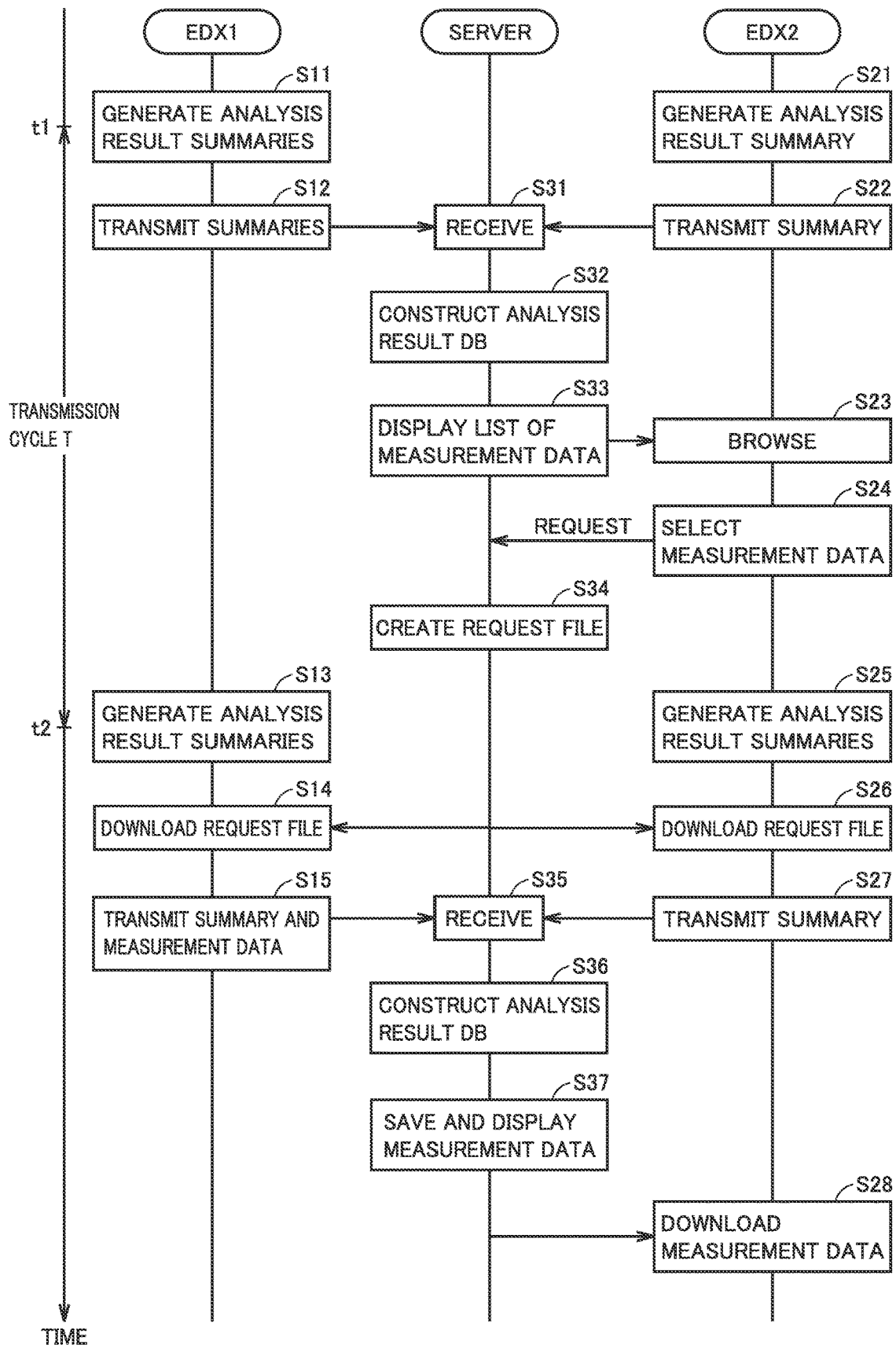
FIG. 7 is a sequence diagram showing one example of steps performed by the analysis system.

FIG. 7 is a sequence diagram showing one example of steps performed by analysis system 100. For ease of explanation, FIG. 7 describes steps performed by analysis apparatuses EDX1, EDX2 and server 4, and those performed by the other analysis apparatuses EDX3 to EDXN are omitted.

In analysis system 100, analysis apparatuses EDX1, EDX2 transmit an analysis result summary to server 4 via the Internet 3 per given transmission cycle T. In FIG. 7, at time t1, information processor 2 included in analysis apparatus EDX1 generates analysis result summaries for multiple analysis results accumulated in HDD 40 (S11). For example, the analysis result summary consists of a table showing an analysis result and the spectrum of the secondary X ray for each of one or more measurement data (see FIG. 6). Information processor 2 transmits the generated analysis result summaries to server 4 via the Internet 3 (S12).

Information processor 2 included in analysis apparatus EDX2 also generates an analysis result summary per given transmission cycle T in the same manner as analysis apparatus EDX1 (S21), and transmits it to server 4 via the Internet 3 (S22).

Upon receipt of the analysis result summaries from analysis apparatuses EDX1, EDX2 (S31), server 4 constructs a database (hereinafter, also referred to as an analysis result DB) for the analysis result summaries, and stores it into storage 5 (S32). This allows the users of analysis apparatuses EDX1, EDX2 to search the analysis result DB and view the analysis result summaries by the other analysis apparatuses EDX.

Next, server 4 publishes a list of multiple analysis result summaries accumulated in the analysis result DB to multiple analysis apparatuses EDX. The list is to show the analysis result summary for each measurement data, and thus will also be referred to as a "list of measurement data." In the example of FIG. 7, server 4 displays a list of measurement data in a browser (S33). FIG. 8 shows one example of the list of measurement data displayed by server 4 in the browser. Referring to FIG. 8, the list of measurement data shows file names of measurement data and the analysis result summaries in association. In the example of FIG. 8, as the analysis result summary, only the quantitative value of each element analyzed is shown.

Returning to FIG. 7, the list of measurement data displayed by server 4 in the browser can be viewed (browsed) at information processor 2 included in each analysis apparatus EDX. For example, assume that the list of measurement data is viewed through information processor 2 included in analysis apparatus EDX2 (S23).

In analysis apparatus EDX2, information processor 2 displays on display unit 46 the list of measurement data (FIG. 8) via server 4, using a browser which is a content display program. The user of analysis apparatus EDX2 views the list of measurement data displayed on display unit 46, thereby knowing the analysis result summary (the quantitative value in the example of FIG. 8) of each measurement data.

If there is measurement data in the list of measurement data that the user wishes to review the details thereof, the user can select the measurement data on the list of measurement data and request server 4 to view the selected measurement data (S24). For example, as shown in FIG. 8, measurement data are listed by name with a check box on the list of measurement data. The user can select measurement data the user wishes to review the details by checking (enters a tick symbol in FIG. 8) a check box corresponding to the name of the measurement data.

Alternatively, information processor 2 included in analysis apparatus EDX2 may automatically select the measurement data whose determination result is indicated by "NG" or "GREY ZONE" in the analysis result summary, and request server 4 to view the selected measurement data. This can obviate the need for the user to select measurement data. Alternatively, the user may select desired measurement data from among measurement data items automatically selected by information processor 2.

Figure 9:
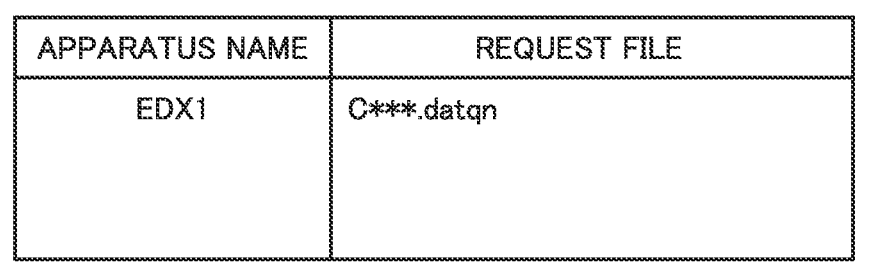

Upon receipt of a view request for viewing the measurement data from analysis apparatus EDX2 after displaying the list of measurement data on a browser, server 4 lists the requested measurement data and creates a request file (S34). FIG. 9 shows one example of the request file created by server 4. Server 4 creates a request file directed to information processor 2, for each analysis apparatus EDX. For example, if the measurement data requested by analysis apparatus EDX2 corresponds to the measurement data acquired through analysis apparatus EDX1, a request file that is directed to information processor 2 of analysis apparatus EDX1 is created, as shown in FIG. 9. The file name of the requested measurement data is listed in the request file. The request file is a text file.

As one transmission cycle T has elapsed since time t1 and a time to transmit an analysis result summary arrives (corresponding to time t2 in FIG. 7), information processor 2 included in each of analysis apparatuses EDX1, EDX2 generates analysis result summaries for one or more measurement data that are acquired during the immediately preceding transmission cycle T (S13, S25). At this time, information processor 2 downloads a request file (see FIG. 9) from server 4 (S14, S28).

If the name of the measurement data that is acquired through the own apparatus is listed in the downloaded request file, information processor 2 reads out the requested measurement data from HDD 40. Information processor 2 then transmits to server 4 the measurement data, together with the analysis result summary (S15). In the example of FIG. 7, information processor 2 included in analysis apparatus EDX1 reads the measurement data listed in the request file from HDD 40, and transmits it to server 4, together with the analysis result summary.

In contrast, since the name of measurement data acquired through the own apparatus is not listed in the request file, information processor 2 included in analysis apparatus EDX2 transmits only the analysis result summary to server 4 (S27).

Upon receipt of the analysis result summaries from analysis apparatuses EDX1, EDX2 (S35), server 4 constructs an analysis result DB and stores it into storage 5 (S36). Next, server 4 stores the measurement data transmitted from information processor 2 of analysis apparatus EDX1 into storage 5, and displays, in the browser, that the measurement data is available for download to information processors 2 included in analysis apparatuses EDX, other than analysis apparatus EDX1 (S37).

In analysis apparatus EDX2, as information processor 2 knows that its own requested measurement data is available for download, information processor 2 downloads the measurement data from server 4 (S28). This allows the user of analysis apparatus EDX2 to review the details of the measurement data. Since the measurement data indicates the spectrum of the secondary X ray, the user can review the details of the spectrum.

Note that in the sequence illustrated in FIG. 7, the step of uploading the measurement data using a request file is by way of example. The measurement data can also be uploaded using a command API (Application Programming Interface).

Moreover, while in the sequence illustrated in FIG. 7, the requested measurement data is transmitted when transmitting the analysis result summary from each analysis apparatus EDX to server 4 per given transmission cycle T, if immediacy is demanded, such as the user wishes to obtain measurement data urgently, the measurement data may be transmitted by forcibly transmitting a request file from server 4 to information processor 2 included in analysis apparatus EDX1, without waiting for the time the analysis result summary is transmitted.

Figure 10:
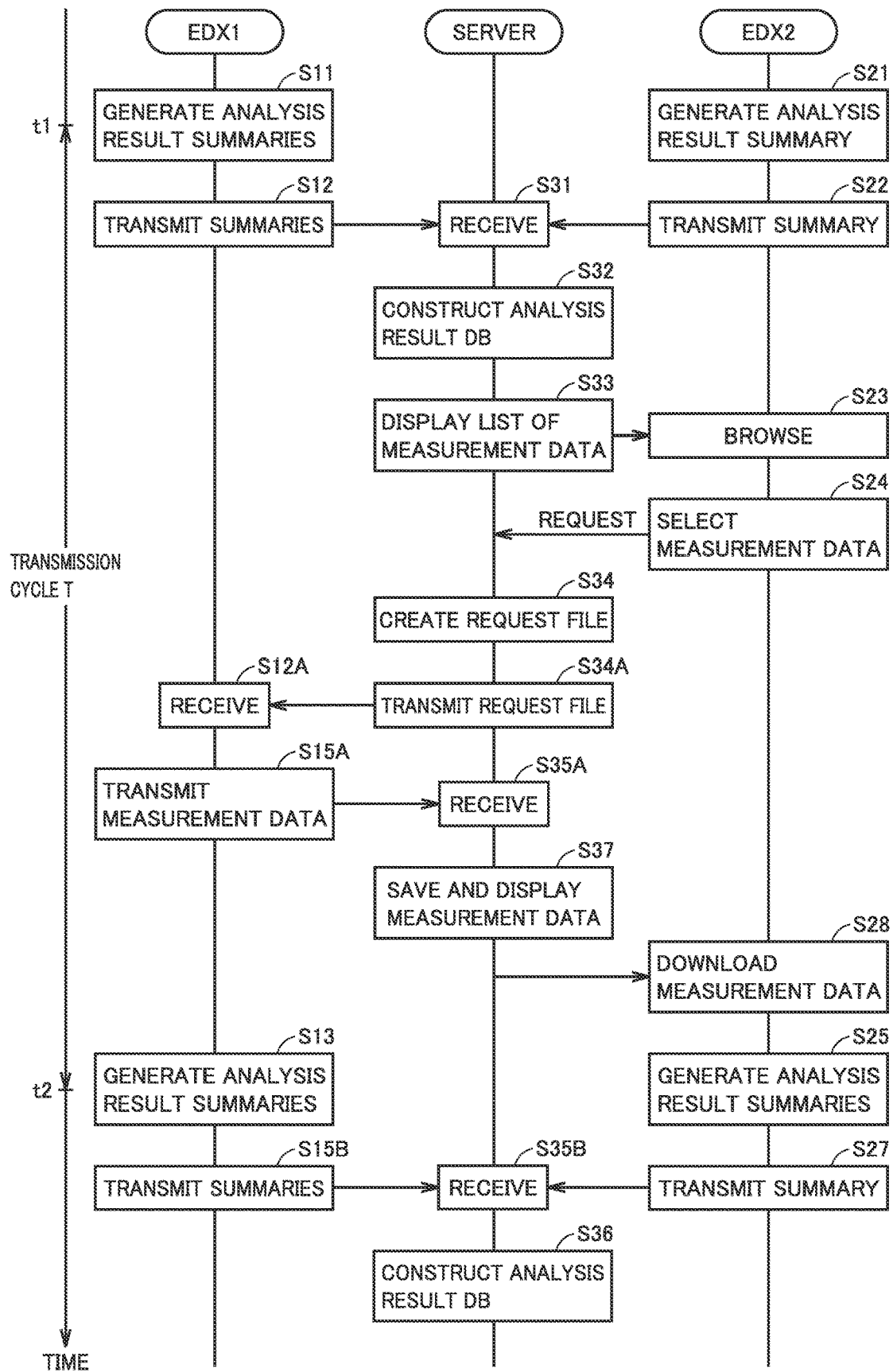
FIG. 10 is a sequence diagram showing another example of the steps performed by the analysis system.

FIG. 10 is a sequence diagram showing another example of the steps performed by analysis system 100, and the figure is shown in contrast to FIG. 7. As with FIG. 7, FIG. 10 describes steps performed by analysis apparatuses EDX1, EDX2 and server 4, and those performed by the other analysis apparatuses EDX3 to EDXN are omitted.

Compared to the sequence diagram illustrated in FIG. 7, in the sequence diagram in FIG. 10, information processor 2 included in analysis apparatus EDX1 transmits measurement data at a different timing.

Specifically, server 4 displays a list of measurement data in a browser (S33), after which, upon receipt of a view request for viewing measurement data from analysis apparatus EDX2, server 4 lists the requested measurement data, and creates a request file (see FIG. 9) (S34). Server 4 transmits the created request file to information processor 2 included in analysis apparatus EDX1 storing the measurement data (S34A).

In analysis apparatus EDX1, upon receipt of the requesting file from server 4 (512A), information processor 2 reads from HDD 40 the measurement data listed in the file and transmits it to server 4 (S15A).

Upon receipt of the measurement data from analysis apparatus EDX1 (S35A), server 4 stores the measurement data into storage 5, and displays, in the browser, that the measurement data is available for download to information processors 2 included in analysis apparatuses EDX, other than analysis apparatus EDX1 (S37).

In analysis apparatus EDX2, once the information processor 2 knows that the own requested measurement data is available for download, information processor 2 downloads the measurement data from server 4 (S28).

Next, as one transmission cycle T has elapsed since time t1 and a time to transmit an analysis result summary arrives (corresponding to time t2 in FIG. 10), information processors 2 included in analysis apparatuses EDX1, EDX2 generate analysis result summaries for one or more measurement data that are acquired during the immediately preceding transmission cycle T (S13, S25). Information processors 2 transmit the generated analysis result summaries to server 4 via the Internet 3 (S15B, S27).

Upon receipt of the analysis result summaries from analysis apparatuses EDX1, EDX2 (S35B), server 4 constructs an analysis result DB and stores it into storage 5 (S36). Although not shown, server 4 displays in the browser a list of multiple analysis result summaries (list of measurement data) accumulated in the analysis result DB.

In the sequence diagram of FIG. 10, upon receipt of a request, from information processor 2 included in analysis apparatus EDX2, for transfer of the measurement data, server 4 immediately transmits the view request to information processor 2 included in analysis apparatus EDX1. Then, in analysis apparatus EDX1, upon receipt of the view request from server 4, the measurement data is immediately transmitted to server 4, separately from transmitting an analysis result summary. This allows the user of analysis apparatus EDX2 to obtain measurement data the user wishes for, without waiting for a time the subsequent analysis result summary is transmitted.

In contrast, according to the sequence diagram illustrated in FIG. 7, information processor 2 included in analysis apparatus EDX1 transmits the measurement data to server 4 when transmitting the analysis result summary, and a load on server 4 thus can be reduced, although this lacks immediacy as in FIG. 10.

As such, according to the analysis system of the present embodiment, server 4 constructs and manages a database of an analysis result summary indicative of an outline of an analysis result of measurement data by each of multiple analysis apparatuses EDX, thereby allowing the capacity of storage 5 that is required to construct the databases to be kept small, as compared to constructing and managing databases for the measurement data by analysis apparatuses EDX (see FIG. 11). Accordingly, a shortage of capacity of storage 5 can be avoided, resulting in inhibiting an increase of operating costs of analysis system 100.

Moreover, since the analysis result summary indicates an outline of an analysis result for each measurement data, the user is allowed to immediately know a specific quantitative value of measurement data by downloading an analysis result summary from server 4. Accordingly, improved user convenience is achieved.

Furthermore, in analysis system 100 according to the present embodiment, information processor 2 included in each analysis apparatus EDX transmits, via server 4, a view request for viewing measurement data to information processor 2 included in other analysis apparatus EDX, thereby allowing the user to also view the measurement data by the other analysis apparatus EDX. Accordingly, the user can review the details of the measurement data, as appropriate.

Moreover, in analysis system 100 according to the present embodiment, measurement data are exchanged between two analysis apparatuses EDX via server 4.

Thus, by server 4 displaying in a browser the measurement data uploaded by one analysis apparatus EDX, the user of the other analysis apparatus EDX can view the measurement data.

While the present embodiment has been described with reference to the analysis apparatus being an X-ray fluorescence analysis apparatus, it should be noted that the analysis apparatus is applicable to any analysis apparatus which analyzes samples and has a function of exchanging data with a server, even though the analysis apparatus is other than the X-ray fluorescence analysis apparatus.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An analysis system in which a plurality of analysis apparatuses and a server are communicably connected,
the plurality of analysis apparatuses, each including:
an apparatus body configured to measure a sample; and
an information processor configured to analyze measurement data measured by the apparatus body,
wherein the information processor has a first storage unit for storing the measurement data and an analysis result of the measurement data, and is configured to generate an analysis result summary based on the analysis result stored in the first storage unit, the analysis result summary indicating an outline of the analysis result, and transmit the analysis result summary to the server,
wherein the server has a second storage unit, and is configured to construct a database for accumulating the analysis result summary received from the information processor, and store the database in the second storage unit,
wherein the server is configured to publish to the plurality of analysis apparatuses a list of analysis result summaries accumulated in the database, the list of analysis result summaries including the analysis result summary,
wherein the list of analysis result summaries includes data in which a file name of the measurement data and the analysis result summary for the measurement data are associated,
wherein the plurality of analysis apparatuses include a first analysis apparatus and a second analysis apparatus respectively having a first information processor and a second information processor,
wherein upon selection of the measurement data by the first analysis apparatus from the list of analysis result summaries, the second information processor is configured to transmit to the server a view request for viewing the selected measurement data,
wherein the server is configured to notify the first information processor of the view request from the second information processor,
wherein upon notice of the view request from the server, the first information processor is configured to read the requested measurement data from the first storage unit and transmit the requested measurement data to the server, and
wherein the second information processor is configured to receive the measurement data from the server.

2. The analysis system according to claim 1, wherein the analysis result summary includes document data representing the outline of the analysis result for the measurement data.

3. The analysis system according to claim 2, wherein the analysis result summary is smaller in file size than the measurement data.

4. The analysis system according to claim 1,
wherein the information processor included in each of the plurality of analysis apparatuses is configured to transmit the analysis result summary to the server per given transmission cycle, and
wherein upon receipt of the view request, the first information is configured to transmit the requested measurement data to the server when transmitting a subsequent analysis result summary.

5. The analysis system according to claim 1,
wherein the information processor included in each of the plurality of analysis apparatuses is configured to transmit the analysis result summary to the server per given transmission cycle, and
wherein upon receipt of the view request, the first information processor is configured to transmit the requested measurement data to the server prior to transmission of a subsequent analysis result summary.

6. An analysis apparatus communicably connectable to a server, the analysis apparatus comprising:
an apparatus body configured to measure a sample; and
an information processor configured to analyze measurement data measured by the apparatus body,
wherein the information processor has a storage unit for storing the measurement data and an analysis result of the measurement data, and is configured to generate an analysis result summary based on the analysis result stored in the storage unit, the analysis result summary indicating an outline of the analysis result, and transmit the analysis result summary to the server, wherein the server has a database for accumulating a plurality of analysis result summaries transmitted from a plurality of analysis apparatuses, the plurality of analysis result summaries including the analysis result summary, the plurality of analysis apparatuses including the analysis apparatus communicably connected to the server, and is configured to publish a list of the plurality of analysis result summaries to the plurality of analysis apparatuses, wherein the list of the plurality of analysis result summaries includes data in which a file name of the measurement data and the analysis result summary for the measurement data are associated, wherein upon selection of the measurement data by another analysis apparatus, among the plurality of analysis apparatuses, from the list of the plurality of analysis result summaries, the information processor is configured to transmit a view request for viewing the selected measurement data to the server, and wherein the information processor is configured to receive the measurement data by the another analysis apparatus from the server.

7. The analysis apparatus according to claim 6, wherein upon notice of the view request for viewing the measurement data by the own analysis apparatus from the server, the information processor is configured to read the requested measurement data from the storage unit and transmit the requested measurement data to the server.

8. A server communicably connectable to a plurality of analysis apparatuses, the plurality of analysis apparatuses each including:
an apparatus body configured to measure a sample;
an information processor configured to analyze measurement data measured by the apparatus body, wherein the information processor is configured to generate an analysis result summary based on an analysis result of the measurement data, the analysis result summary indicating an outline of the analysis result, and transmit the analysis result summary to the server, wherein the server has a storage unit, and is configured to construct a database in which the analysis result summary received from the information processor is accumulated, and store the database into the storage unit, wherein the server is configured to publish to the plurality of analysis apparatuses a list of analysis result summaries accumulated in the database, the list of analysis result summaries including the analysis result summary, and wherein the list of analysis result summaries includes data in which a file name of the measurement data and the analysis result summary for the measurement data are associated.

9. An information processing method in an analysis system in which a plurality of analysis apparatuses and a server are communicably connected, wherein the plurality of analysis apparatuses each include a first storage unit for storing measurement data of a sample and an analysis result of a measurement data, the server has a second storage unit, and the plurality of analysis apparatuses include a first analysis apparatus and a second analysis apparatus respectively having a first information processor and a second information processor, the information processing method comprising:

generating, by each of the plurality of analysis apparatuses, an analysis result summary based on the analysis result stored in the first storage unit, the analysis result summary indicating an outline of the analysis result, and transmitting the analysis result summary to the server;

constructing, by the server, a database of a plurality of analysis result summaries transmitted from the plurality of analysis apparatuses, and storing the database into the second storage unit, the plurality of analysis result summaries including the analysis result summary;

publishing, by the server, a list of the plurality of analysis result summaries accumulated in the database to the plurality of analysis apparatuses, wherein the list of the plurality of analysis result summaries includes data in which a file name of the measurement data and the analysis result summary for the measurement data are associated;

upon selection of the measurement data by the first analysis apparatus from the list of the plurality of analysis result summaries, transmitting, by the second information processor, a view request for viewing the selected measurement data to the server;

notifying, by the server, the first information processor of the view request from the second information processor;

upon notification of the view request from the server, reading, by the first information processor, the requested measurement data from the first storage unit and transmitting the requested measurement data to the server; and receiving, by the second information processor, the measurement data from the server.

* * * * *